United States Patent
Djavanroodi

(10) Patent No.: US 12,137,642 B1
(45) Date of Patent: *Nov. 12, 2024

(54) HIGH DENSITY PLANT GROWTH APPARATUS

(71) Applicant: Prince Mohammad Bin Fahd University, Dhahran (SA)

(72) Inventor: Faramarz Djavanroodi, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,370

(22) Filed: Feb. 16, 2024

Related U.S. Application Data

(63) Continuation of application No. 18/480,881, filed on Oct. 4, 2023.

(51) Int. Cl.
*A01G 31/06* (2006.01)
(52) U.S. Cl.
CPC .................................... *A01G 31/06* (2013.01)
(58) Field of Classification Search
USPC .............. 47/59 S, 59 R, 62 R, 63, 83, 82, 79
See application file for complete search history.

(56) References Cited

U.S. PATENT DOCUMENTS 4,194,041 A * 3/1980 Gore ...................... D06N 3/183
  2/87
4,443,511 A * 4/1984 Worden ................. D06N 3/183
  428/196
5,026,591 A * 6/1991 Henn .................... D06N 3/0095
  428/315.9

(Continued)

FOREIGN PATENT DOCUMENTS

CN   109518834 A   3/2019
CN   214508199 U   10/2021
(Continued)

OTHER PUBLICATIONS

What is Gore-Tex and What Makes It an Outdoor Essential? The science behind how this rugged material works, Written by Kevin Cortez, Updated Jan. 24, 2022 [retrieved from internet Apr. 29, 2024 https://reviewed.usatoday.com/style/features/what-gore-tex-science-behind-technology] 6 pages.*

(Continued)

*Primary Examiner* — Andrea M Valenti
(74) *Attorney, Agent, or Firm* — Oblon, McClelland, Maier & Neustadt, L.L.P.

(57) ABSTRACT

A tower garden for vertical farming includes a vertical column with a plurality of vertical growth modules. The plurality of vertical growth modules are stacked over and connected to each other in a vertical direction and are configured to grow plants in the vertical direction. The tower garden further includes a base positioned below the vertical column. The base is configured to receive a reservoir including an agricultural medium. The tower garden further includes a perforated hose extending from the base of the vertical column in the vertical direction. The perforated hose is configured as a conduit for the agricultural medium to flow upwards and cascade over roots of the plants. Each growth module includes a plastic pocket with a hole.

14 Claims, 8 Drawing Sheets

(56) References Cited

U.S. PATENT DOCUMENTS

| | | | | |
|---|---|---|---|---|
| 5,617,673 | A * | 4/1997 | Takashima | A01G 31/047 47/60 |
| 7,143,544 | B2 | 12/2006 | Roy | |
| 8,181,391 | B1 * | 5/2012 | Giacomantonio | A01G 31/02 47/62 A |
| D896,690 | S | 9/2020 | Adolf | |
| 11,310,976 | B1 | 4/2022 | Cross | |
| 2003/0114061 | A1 * | 6/2003 | Matsuda | A61L 31/10 442/369 |
| 2004/0093793 | A1 * | 5/2004 | Mori | A01G 27/06 47/65.7 |
| 2005/0166451 | A1 * | 8/2005 | Stachnik | A01G 9/025 47/65.7 |
| 2007/0157513 | A1 * | 7/2007 | Varney | A01G 9/026 47/71 |
| 2010/0004373 | A1 * | 1/2010 | Zhu | C09D 167/00 524/847 |
| 2012/0279126 | A1 | 11/2012 | Simmons | |
| 2013/0145690 | A1 | 6/2013 | Cannon | |
| 2014/0193477 | A1 * | 7/2014 | Chaikof | A61L 27/34 428/221 |
| 2016/0066525 | A1 * | 3/2016 | Duquesnay | A01G 9/025 47/62 R |
| 2018/0014486 | A1 | 1/2018 | Creechley | |
| 2018/0213734 | A1 | 8/2018 | Smith | |
| 2019/0071177 | A1 * | 3/2019 | Zvara | A01C 21/005 |
| 2020/0008366 | A1 * | 1/2020 | Klein | A01G 9/023 |
| 2020/0029508 | A1 | 1/2020 | Vazquez Losada | |
| 2022/0061242 | A1 * | 3/2022 | Sperry | A01G 31/06 |
| 2023/0065706 | A1 * | 3/2023 | Shammaa | A01G 31/06 |
| 2023/0125260 | A1 | 4/2023 | Enos | |

FOREIGN PATENT DOCUMENTS

| | | | | |
|---|---|---|---|---|
| DE | 202021106896 | * | 2/2022 | A01G 31/06 |
| JP | 63074423 | * | 4/1988 | A01G 9/00 |
| JP | 2001-212899 | | 8/2001 | |
| JP | 2021-153565 A | | 10/2021 | |
| KR | 10-1557553 B1 | | 10/2015 | |
| KR | 20210113544 | * | 9/2021 | A01G 9/023 |
| KR | 20220123685 | | 9/2022 | |
| WO | WO 2022/197597 | | 9/2022 | |

OTHER PUBLICATIONS

Progress in Sol-Gel Technology for the Coatings of Fabrics, by Aravin Prince Periyasamy et al [retrieved from internet Apr. 29, 2024 https://www.mdpi.com/1996-1944/13/8/1838] 102 pages.*

"Vertical Farming Case Study", Alberta Agriculture, Forestry and Rural Economic Development, SERECON, File No. 081A18.1, Apr. 2021, 133 pages.

* cited by examiner

HIGH DENSITY PLANT GROWTH APPARATUS

CROSS-REFERENCE TO RELATED APPLICATIONS

The present application is a Continuation of U.S. application Ser. No. 18/480,881, pending, having a filing date of Oct. 4, 2023.

BACKGROUND

Technical Field

The present disclosure is directed to farming, and more particularly, relates to a tower garden for vertical farming.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Horizontal farming is a traditional method for growing agricultural plants. However, due to an ever increasing population, land available for farming is decreasing whereas the demand for agricultural products is increasing. However, traditional methods of horizontal farming are not sufficient to meet the demand. For example, the amount of water required for horizontal agricultural farming is huge. Therefore, a need arises for a sustainable and energy efficient farming method. Multiple iterations of controlled environment-agriculture (CEA) have been developed and implemented. CEA is a concept of growing agricultural plants in a man-made environment, usually indoors. CEA methods include hydroponic systems, aquaponic systems and aeroponic systems. Hydroponic systems use enriched water as an agricultural medium instead of soil. Aquaponic systems are a combination of agriculture and aquaculture. Aeroponic systems use streams of enriched agricultural medium that is aerosolized and sprayed over the plants. However, due to low yield and high power needs, conventional CEA methods have not been widely adopted.

US20130145690A1 discloses an array of horticultural containers arranged in the vertical and horizontal directions. A pressurized fluid supply line is used with a timer to irrigate the plants. A solar panel may be used. The containers can be made of polystyrene. However, these containers are separated and disconnected from each other. The pressurized fluid supply line includes complex discharge ports and discharge ends.

CN109518834A discloses a vertical garden. Ventilation and water supply systems of the vertical garden include a porous conductive medium and pipelines each having a branch pipeline connected to the plant layer. Therefore, a large number of pipelines and branch pipelines are needed.

Each of the aforementioned conventional agricultural strategies suffers from one or more drawbacks hindering their adoption. Accordingly, it is one object of the present disclosure to provide a tower garden directed towards vertical farming which is energy efficient and easy to implement.

SUMMARY

In an exemplary embodiment, a tower garden for vertical farming is disclosed. The tower garden includes a vertical column with a plurality of vertical growth modules. The plurality of vertical growth modules are stacked over and connected to each other in a vertical direction and are configured to grow plants in the vertical direction. The tower garden further includes a base positioned below the vertical column. The base is configured to receive a reservoir including an agricultural medium that is not soil. The tower garden further includes a perforated hose extending from the base of the vertical column in the vertical direction. The perforated hose is configured as a conduit for the agricultural medium to flow upwards and cascade over roots of the plants. Each growth module includes a plastic pocket with a hole.

In some embodiments, at least one portion of the plastic pocket includes a membrane permeable to water vapor and impermeable to liquid water.

In some embodiments, the membrane includes a spunbond polymer outer layer and an inner layer including at least one of a collagen layer or a silica sol gel layer. The inner layer is a continuous layer having a thickness of 50-25 µm.

In some embodiments, the membrane includes stretched or expanded polytetrafluoroethylene.

In some embodiments, the membrane is configured to allow water vapor to exit to prevent overheating inside the plastic pocket.

In some embodiments, the hole is covered by the membrane that is configured to physically support a plant.

In some embodiments, at least one portion of the plastic pocket is heat-insulating and is impermeable to liquid water and water vapor.

In some embodiments, the at least one portion of the plastic pocket includes polystyrene.

In some embodiments, the perforated hose includes a first inlet configured to receive the agricultural medium and a second inlet configured to receive artificial light for the perforated hose to function as a perforated light guide pipe.

In some embodiments, the perforated hose is transparent.

In some embodiments, the perforated hose includes at least one material selected from the group consisting of an acrylic polymer, a cyclic olefin polymer, a polycarbonate, a polymethacrylmethylimide, a silicone resin and glass.

In some embodiments, the perforated hose further includes a third inlet configured to receive a gas to control at least one of humidity or temperature.

In some embodiments, the perforated hose is heat resistant to at least 50° C.

In an exemplary embodiment, the tower garden includes a plurality of vertical columns arranged around the perforated hose, and the perforated hose is connected to each growth module of the plurality of vertical columns via a respective opening of the perforated hose.

In some embodiments, the perforated hose is located in a center of the plurality of vertical columns.

In some embodiments, the tower garden further includes a pump configured to cause the agricultural medium to flow from the reservoir via the perforated hose to a top area of the vertical column.

In some embodiments, the tower garden includes a heating, ventilation, and air conditioning (HVAC) system configured to maintain an average humidity of 75-85% and an average temperature of 18-24° C. within the tower garden.

In some embodiments, the tower garden includes a controller configured to repeatedly cause the agricultural medium to flow upward via the perforated hose and cascade over the roots of the plants.

In some embodiments, the tower garden includes a solar panel configured to provide power for the tower garden.

In some embodiments, the agricultural medium is free of solids.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
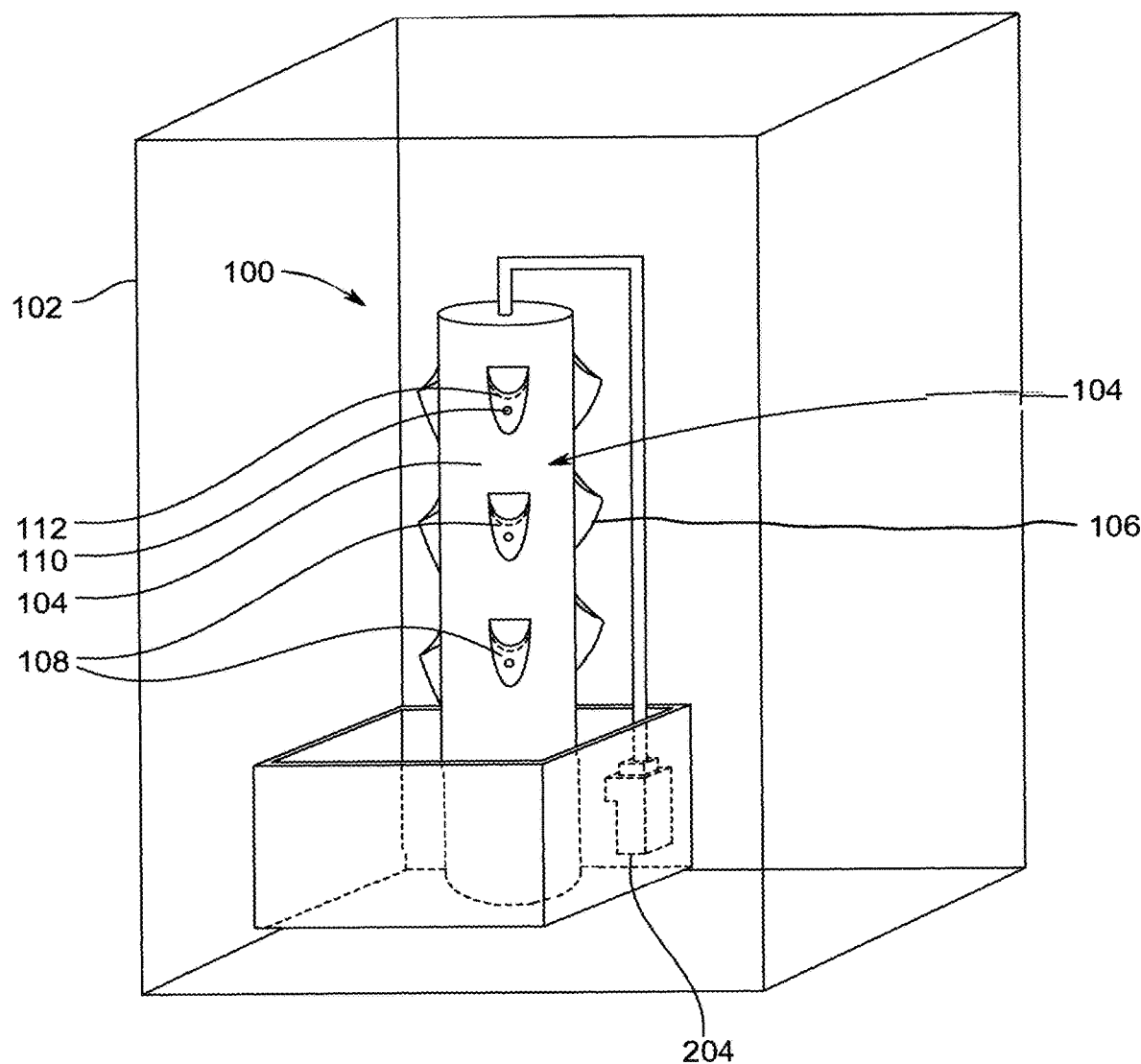
FIG. 1 is a schematic perspective view of a tower garden used for vertical farming, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of this disclosure are directed to a tower garden for vertical farming. The tower garden of the present disclosure can use a hydroponic, aeroponic or aquaponic approach to grow agricultural plants in a controlled indoor environment. Techniques herein provide a vertical farming method in which plants are grown by directly cascading an agricultural medium over the roots of the plants and a plurality of vertical growth modules. For an aeroponic system, plants are grown in a misty environment. The mist can include an aerosolized agricultural medium that is sprayed over the roots of the plants using a pressure pump attached to an array of nozzles. Aeroponic systems use up to 90% less water when compared to aquaponic systems.

Referring to FIG. 1, a schematic perspective view of a tower garden 100 for vertical farming is illustrated, according to an embodiment of the present disclosure. In an embodiment, the tower garden 100 may be supported by an outer structure 102. The outer structure 102 is a strength member and is configured to support the tower garden 100. The outer structure 102 may be structurally coupled with or independent of the tower garden 100. In an example, the outer structure 102 may be configured to bear loads of up to 140 kgs (kilograms), preferably up to 170 kgs, preferably up to 200 kgs. The outer structure 102 can be constructed using carbon steel, as carbon steel has a high load bearing capacity and a high yield strength. In some embodiments, the outer structure 102 may be constructed using a metal having the same properties as carbon steel. The outer structure 102 may have a length of 0.5-2.5 meters, preferably 1.0-2.0 meters, preferably 1.2-1.8 meters, a width of 0.5-2.0 meters, preferably 0.7-1.7 meters, preferably 0.9-1.3 meters, and a height of 0.5-2.5 meters, preferably 1.0-2.0 meters, preferably 1.2-1.8 meters. In one embodiment, the outer structure 102 may have the dimensions as follows: length—1.5 m, width—1 m and height—1.56 m. In some embodiments, the dimensions of the outer structure 102 may be defined based on a size of the tower garden 100.

The tower garden 100 includes a vertical column 104 for growing plants in a vertical direction (relative to the ground). In some embodiments, the tower garden 100 includes a plurality of the vertical columns 104. Particularly, the plurality of vertical columns 104 includes a plurality of growth modules 106 that are stacked over and connected to each other in the vertical direction. The plurality of growth modules 106 is configured to grow plants in the vertical direction. The plurality of vertical columns 104 are constructed of plastic materials such as, but not limited to, polystyrene. Polystyrene is a synthetic polymer made from monomers of the aromatic hydrocarbon styrene. Polystyrene is a waterproof thermoplastic material that acts as a heat and sound insulator. The plurality of vertical columns 104 are strengthened to bear the load of the plurality of growth modules 106. Each growth module of the plurality of growth modules 106 includes a plastic pocket 108 with a hole 110. Each plastic pocket 108 of each of the plurality of growth modules 106 has a pre-defined volume to house seedlings of the plants that are to be planted in the tower garden 100. In some embodiments, the plurality of growth modules 106 are refillable and modular in nature as per the requirements from the tower garden 100.

Problems associated with keeping plants in impermeable (e.g., polymer or synthetic material-based) containers include an inability for roots to "breathe" and overheating in the growth medium. In some embodiments, the plastic pocket 108 includes a membrane 112 which is configured to cover the hole 110 in the plastic pocket 108 and physically support one or more plants present in the plastic pocket 108. According to an embodiment of the present disclosure, at least one portion of the plastic pocket 108 includes the membrane 112. In some embodiments, the membrane 112 of the plastic pocket 108 is permeable to oxygen and water vapors. In some embodiments, the membrane 112 is configured to allow water vapors and/or heat to exit to prevent overheating inside the plastic pocket 108. The membrane 112 of the plastic pocket 108 can include stretched or expanded polytetrafluoroethylene. Generally, polytetrafluoroethylene is a synthetic fluoropolymer of tetrafluoroethylene. Polytetrafluoroethylene is a fluorocarbon solid, as it is a high-molecular-weight polymer consisting of carbon and fluorine. In some embodiments, the membrane 112 of the plastic pocket 108 is configured to allow water vapors to escape from the plastic pocket 108 to prevent temperatures increase and subsequent overheating in the plastic pocket 108. The membrane 112 of the plastic pocket 108 further provides additional support to the plants. In some embodiments, at least one portion of the plastic pocket 108 is an insulator to heat and includes polystyrene which is impermeable to liquid water and water vapors and is heat-insulating. Particularly, the plastic pocket 108 may include both the membrane 112 and polystyrene to have advantages of both materials without "suffocating" or overheating the roots.

Preferred materials for the membrane 112 include both monolithic and porous materials. Monolithic materials are of continuous structure and typically do not permit the passage of liquid water while permitting passage of water vapor and other gases. In contrast, a porous film typically is at least partially pervious to liquid water and also permits passage or transport of water vapor. Preferred porous membranes are made from materials such as polyamide (polyamide 6.6) and polyvinyl chloride. Porous membranes may be both woven and nonwoven (cast). Non-woven membrane materials such as air laid, thermal bonded, melt blown, hydroentangled materials and spunbond are preferred for structural support, the ability to resist passage of liquids and high vapor transport of water vapor.

In an especially preferred embodiment of the invention, the membrane 112 is made from a spunbond nonwoven material that is porous to liquid water transport. The spunbond membrane is an outer layer adjacent to an inner (i.e., facing towards the vertical column) coating of a collagen and/or sol gel material that functions to inhibit liquid water transport across the membrane while permitting gaseous water transport through the inner layer and the spunbond material. The combination of a water pervious porous spunbond membrane supporting an inner layer of a continuous collagen or sol gel provides improved structural properties such as the ability to retain a cup-like shape and concurrently serves to encourage root growth through the collagen and/or sol gel of inner layer through the pores of the non-woven material such that root growth can extend outside the membrane for exposure to air. The collagen membrane preferably comprises animal collagen. The sol gel membrane preferably comprises a silica sol. The inner layer preferably has a thickness of 50-250 μm, more preferably 100-200 μm.

Figure 2:
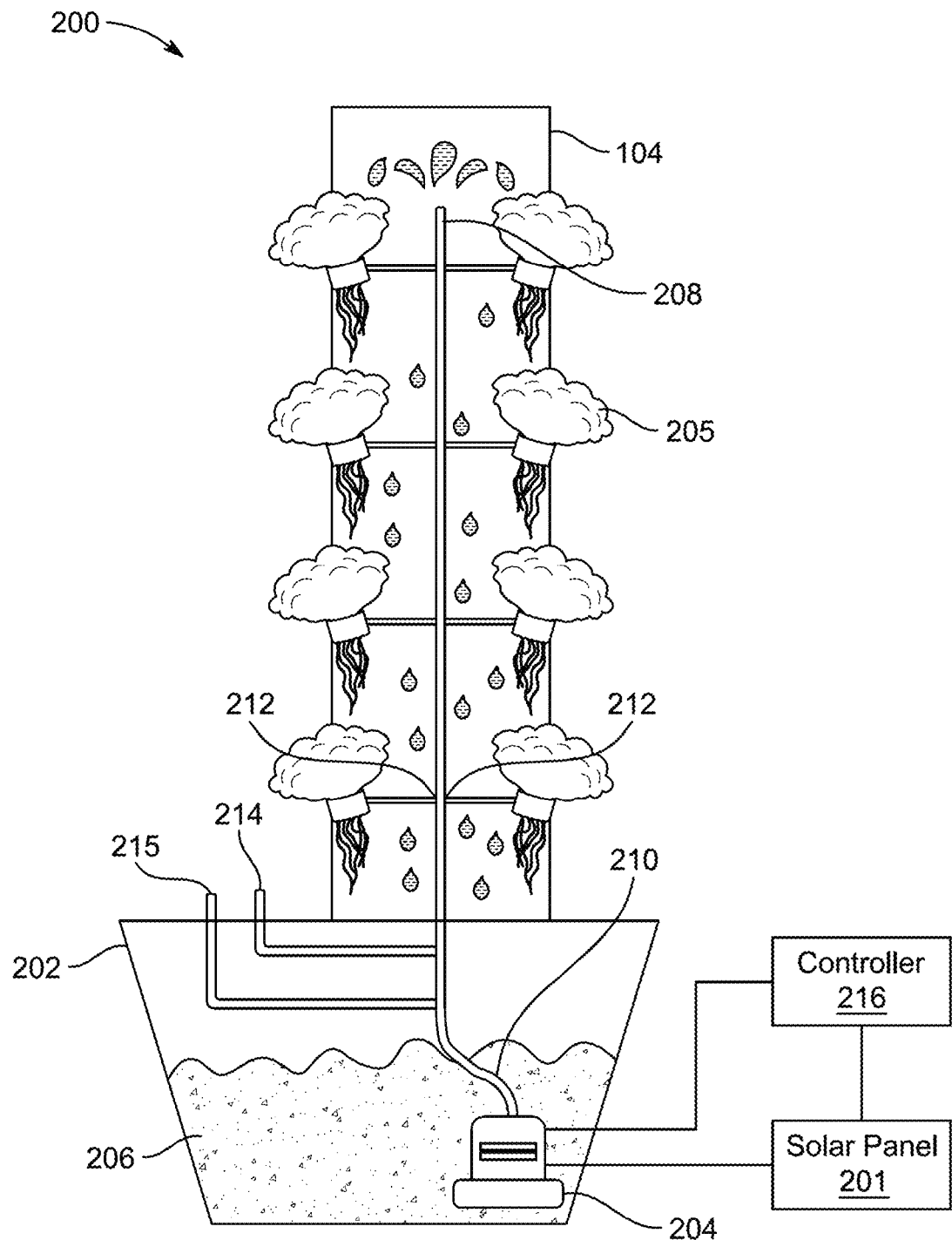
FIG. 2 is a pictorial representation of the tower garden, according to certain embodiments.

Referring to FIG. 2, a pictorial representation 200 of the tower garden 100 of FIG. 1 is illustrated, according to an embodiment of the present disclosure. In an embodiment, the tower garden 100 may be implemented in a commercial and scalable environment. In some embodiments, the tower garden 100 may be implemented in a home setup. In accordance with an embodiment of the present disclosure, the tower garden 100, shown in FIG. 1 and FIG. 2, includes a base 202 positioned below the vertical column 104. Particularly, the base 202 is a storage container configured to receive a pump 204 therein. The tower garden as shown in FIG. 2 includes a plurality of plants 205. Further, the base 202 is configured to receive a reservoir including an agricultural medium 206. According to the present disclosure, the agricultural medium 206 is not soil. Preferably the agricultural medium is a liquid material free of solids, a solid substrate or a solid matrix. The base 202 supports the vertical farming structure by providing strength to the tower garden 100. The agricultural medium 206 is pumped in the vertical direction using the pump 204. The agricultural medium 206 is a nutrient rich liquid including a plurality of essential nutrients required for healthy growth of plants 205 disposed in the plurality of vertical columns 104 of the tower garden 100. In some embodiments, the agricultural medium 206 may be a liquid or a liquid comprising a dissolved gas. Accordingly, the pump 204 serves to provide a suction power to move a gaseous agricultural medium from the base 202 to the perforated hose 208. When not in operation, the pump 204 can block a first inlet 210 of the perforated hose 208 to prevent fluidly communication.

In some embodiments, the pump 204 may be waterproof. The pump 204 is operated repeatedly or intermittently to pump and cascade the agricultural medium 206 over the roots of the plants 205 planted in the plurality of growth modules 106 installed inside the plurality of vertical columns 104 of the tower garden 100. The pump 204 is configured to cause the agricultural medium 206 to flow from the base 202 via a perforated hose 208 to a top area of the plurality of vertical columns 104. In an example, the pump 204 employed in the tower garden 100 has a maximum flow rate ($Q_{max}$) of 500-1000 liters per hour (L/h), preferably 600-900 L/h, preferably about 700 L/h, with a max head (Hmax) of 0.5-1.5 m, preferably 0.7-1.3 m, preferably about 1.0 m. The power consumption of the pump 204 may be 5-20 watts, preferably 10-15 watts, preferably about 13 watts at 220-240 volts (e.g. 230 volts) or 110-120 volts (e.g. 110 volts). In some embodiments, specifications of the pump 204 may be defined based on the area of implementation of the tower garden 100 and the load on the pump 204. In some embodiments, the tower garden 100 includes a solar panel 201 configured to provide power for the pump 204.

In an embodiment, the plurality of vertical columns 104 extends from the base 202 in the vertical direction and is mechanically coupled with the base 202 with fastening members. In some embodiments, the plurality of vertical columns 104 may be structurally integrated with the base 202. The plurality of vertical columns 104 have a height defined from the base 202 to the top area thereof in the vertical direction. The height of the plurality of vertical columns 104 may be dependent on the yield needs of the tower garden 100 in a particular area of implementation. As such, in higher yield implementations, the height of the plurality of vertical columns 104 may be higher.

The perforated hose 208 extending from the base 202 in the vertical direction is surrounded by the plurality of vertical columns 104. In some embodiments, the perforated hose 208 serves the function of delivering an irrigation medium for the plants 205, planted in the plastic pockets 108 of each of the plurality of growth modules 106 of the plurality of vertical columns 104. Particularly, the perforated hose 208 is configured as a conduit for the agricultural medium 206 to flow upward and cascade over roots of the plants 205 planted in the tower garden 100. The perforated hose 208 includes a first inlet 210 configured to receive the agricultural medium 206 pumped in by the pump 204 to flow through the perforated hose 208. The perforated hose 208 further includes perforations 212 at pre-defined distance along a height of the perforated hose 208 in the vertical direction. The pre-defined distance may be measured as per the placement of the plurality of growth modules 106. The agricultural medium 206 flows out of the perforations 212 directly onto the roots of the plants 205 planted in the plastic pocket 108 of the plurality of growth modules 106.

When high-density plants are built around a central axis, i.e., the perforated hose 208, sun exposure may be uneven, e.g., an upper level versus a lower level, leaves of the high-density plants near the central axis versus leaves away from the central axis. In some embodiments, a perforated tube 208 can be used both as a perforated hose for irrigation and as a perforated light pipe for artificial light. Accordingly, the perforated hose 208 further can include a second inlet 214 configured to receive artificial light (e.g., visible light and/or ultraviolet light) necessary for the growth of the plants 205 of the tower garden 100 and to function as a perforated light guide pipe. Accordingly, the perforated hose 208 can be made of at least one material selected from the group consisting of an acrylic polymer, a cyclic olefin polymer, a polycarbonate, a polymethacrylmethylimide, a silicone resin and glass.

In some embodiments, the perforated hose 208 includes a third inlet 215 configured to receive a gas to control at least one of temperature or humidity in the tower garden 100, and dry the perforated hose 208 when necessary. In some embodiments, the perforated hose 208 is transparent and heat resistant up to at least 50° C.

In some embodiments, the tower garden 100 includes the plurality of vertical columns 104. In such a case, the perforated hose 208 is surrounded by the plurality of vertical columns 104 and the perforated hose 208 is located at a center of the plurality of vertical columns 104. Further, the perforated hose 208 is fluidly connected to each growth module of the plurality of growth modules 106 present in the plurality of vertical columns 104 via a respective opening of the perforated hose 208. In some embodiments, the tower garden 100 includes a controller 216 configured to be in communication with the pump 204. The controller 216 may actuate the pump 204 to supply the agricultural medium 206 to the plants 205 disposed in the vertical column 104 based on various input parameters such the surrounding temperature and humidity. The controller 216 may also be in communication with the solar panel 201 to receive the power therefrom.

Figure 3:
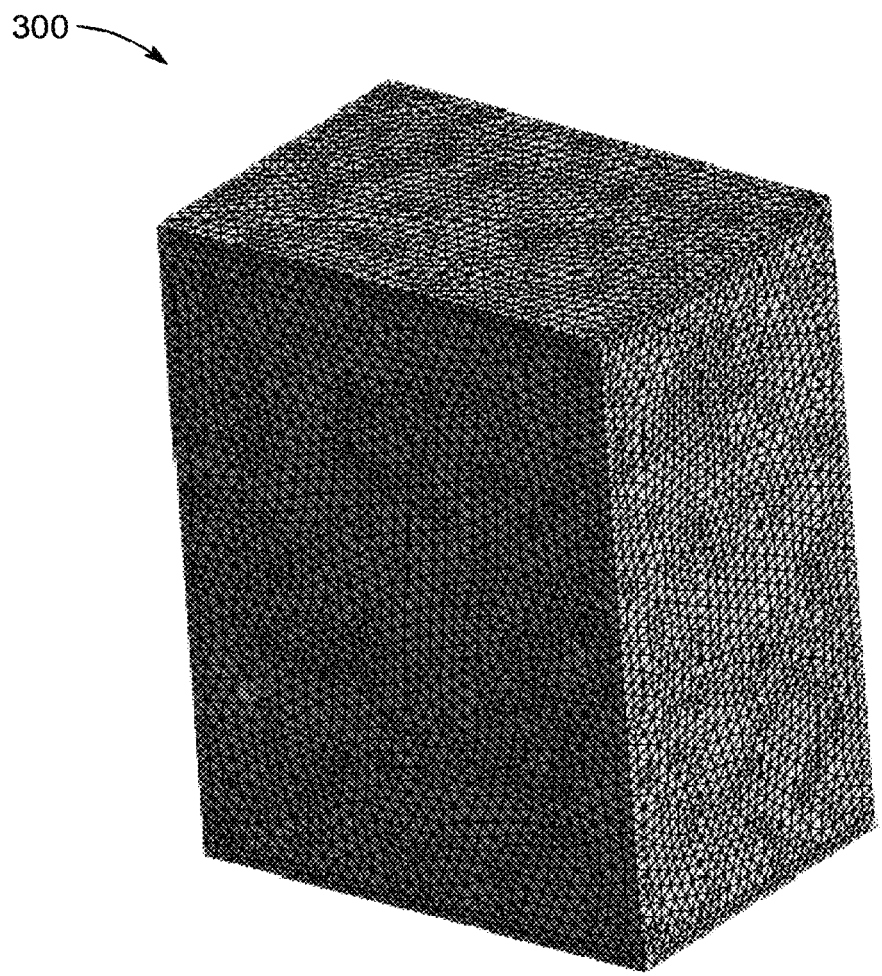
FIG. 3 is an exemplary illustration of a simulation of an elements mesh of the tower garden, according to certain embodiments.

An exemplary illustration of a mesh 300 for the tower garden 100 is shown in FIG. 3, according to an embodiment of the present disclosure. The mesh 300 is designed to represent the tower garden 100 simulation software. In an example, the ANSYS FLUENT software was used for virtual testing and simulation of the tower garden 100 using the mesh 300 (e.g., a 512K elements mesh). As shown in FIG. 3, the type of elements used is the tetrahedral, the number of elements is 329723, and the number of nodes is 64762.

Figure 4:
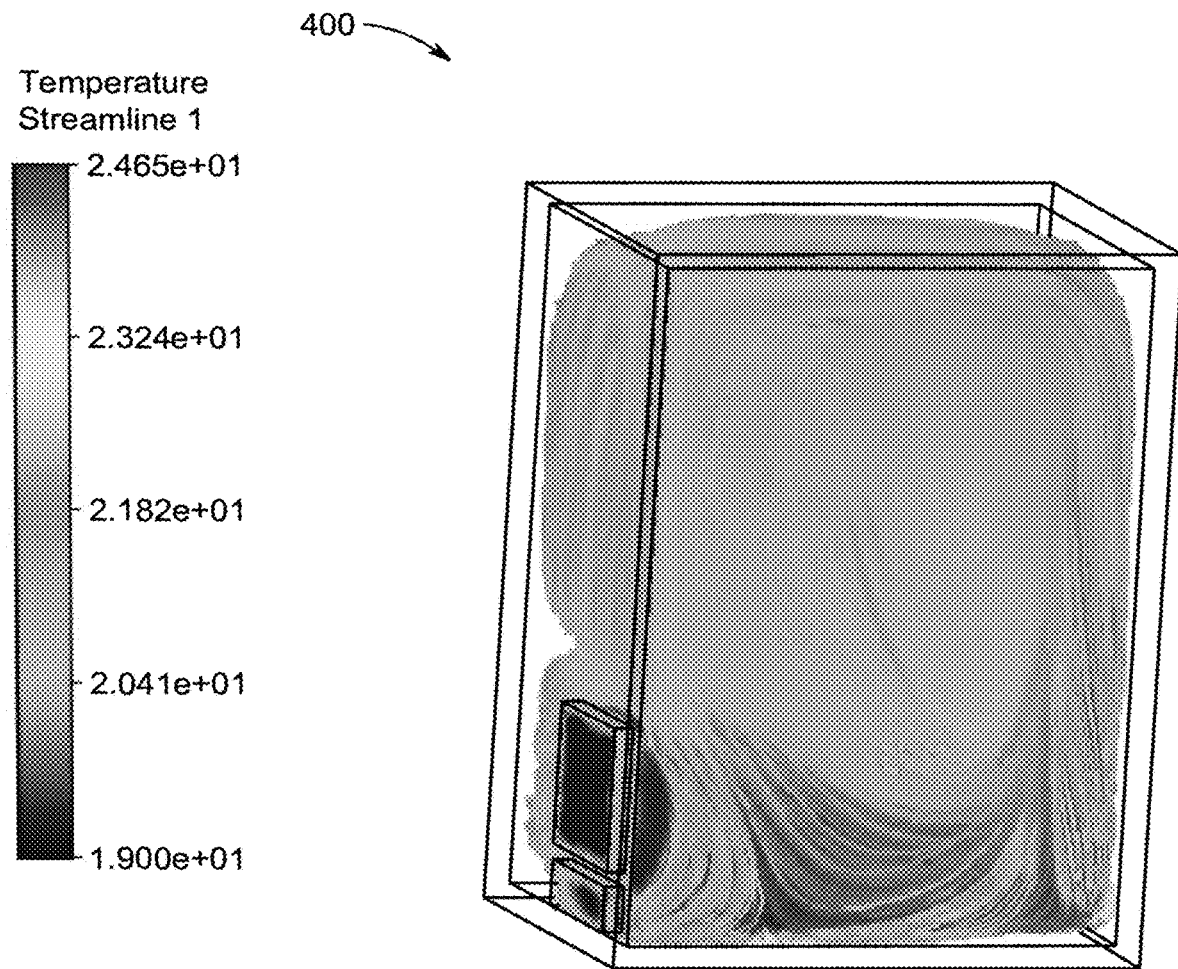
FIG. 4 is an exemplary illustration depicting temperature variation in the tower garden as per air flow, according to certain embodiments.

The tower garden 100 has provisions for air flow to control temperature and humidity therein. An exemplary illustration depicting the temperature variation as per the air flow in the tower garden 100 is shown in FIG. 4, according to an embodiment of the present disclosure. The temperature variation is illustrated by a temperature variation diagram 400. The temperature variation diagram 400 was generated after the testing and simulation of the tower garden 100 using ANSYS FLUENT.

Figure 5:
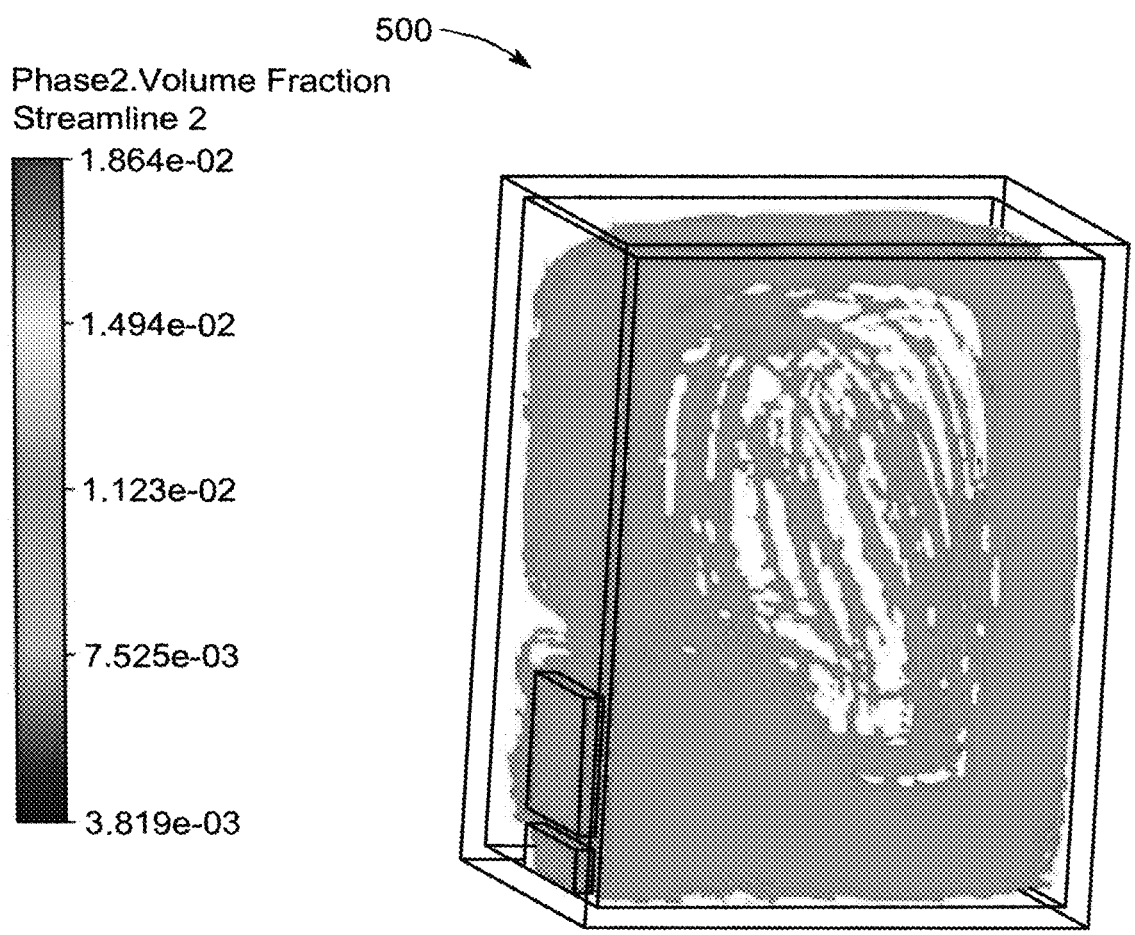
FIG. 5 is an exemplary illustration depicting temperature variation in the tower garden as per water vapor flow, according to certain embodiments.

An exemplary illustration depicting the variation in temperature as per the flow of water vapor in the tower garden 100 is shown in FIG. 5, according to an embodiment of the present disclosure. The water vapor is generated using the agricultural medium 206. The perforated hose 208 acts as the conduit for the water vapor to travel into the tower garden 100 and to the plurality of growth modules 106. The water vapor maintains the humidity required for optimal growth of the plants 205 planted inside the plastic pocket 108 of the plurality of growth modules 106. The temperature variation due to water vapor is illustrated in a temperature variation diagram 500.

Figure 6:
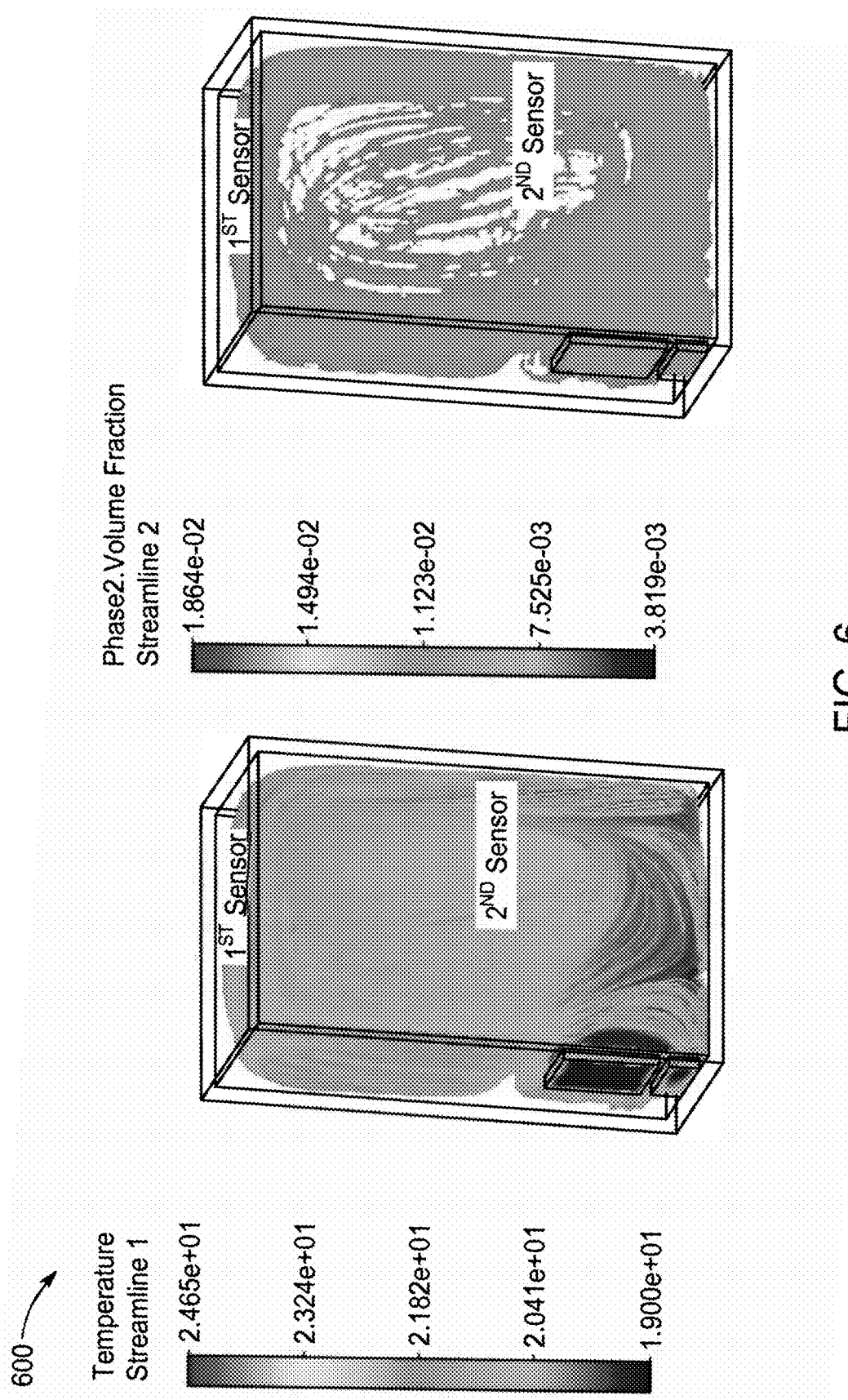
FIG. 6 is an exemplary illustration of distribution of humidity and temperature in the tower garden, according to certain embodiments.

The tower garden 100 needs constant monitoring of temperature and humidity variations for optimal growth of the plants 205 planted inside the plurality of growth modules 106 installed in the plurality of vertical columns 104 of the tower garden 100. The ideal temperature range for majority of vegetable plants is 18° C. to 24° C., preferably 20-22° C., preferably about 21° C., and the ideal humidity range for majority of vegetable plants is 75% to 95%, preferably 80-90%, preferably about 85%. An exemplary illustration of placement of temperature and humidity sensors in the tower garden 100 is shown in FIG. 6, according to an embodiment of the present disclosure. The sensor placement diagram 600 illustrates the positions of the temperature and humidity sensors. The tower garden 100 includes at least two sensors. A first sensor, otherwise referred to as the temperature sensor, is electrically coupled with a monitoring unit positioned at the top area of the tower garden 100 for temperature monitoring. The tower garden 100 further includes a second sensor, otherwise referred to as the humidity sensor, electrically coupled to the monitoring unit positioned at the top area of the tower garden 100 for humidity monitoring.

Figure 7:
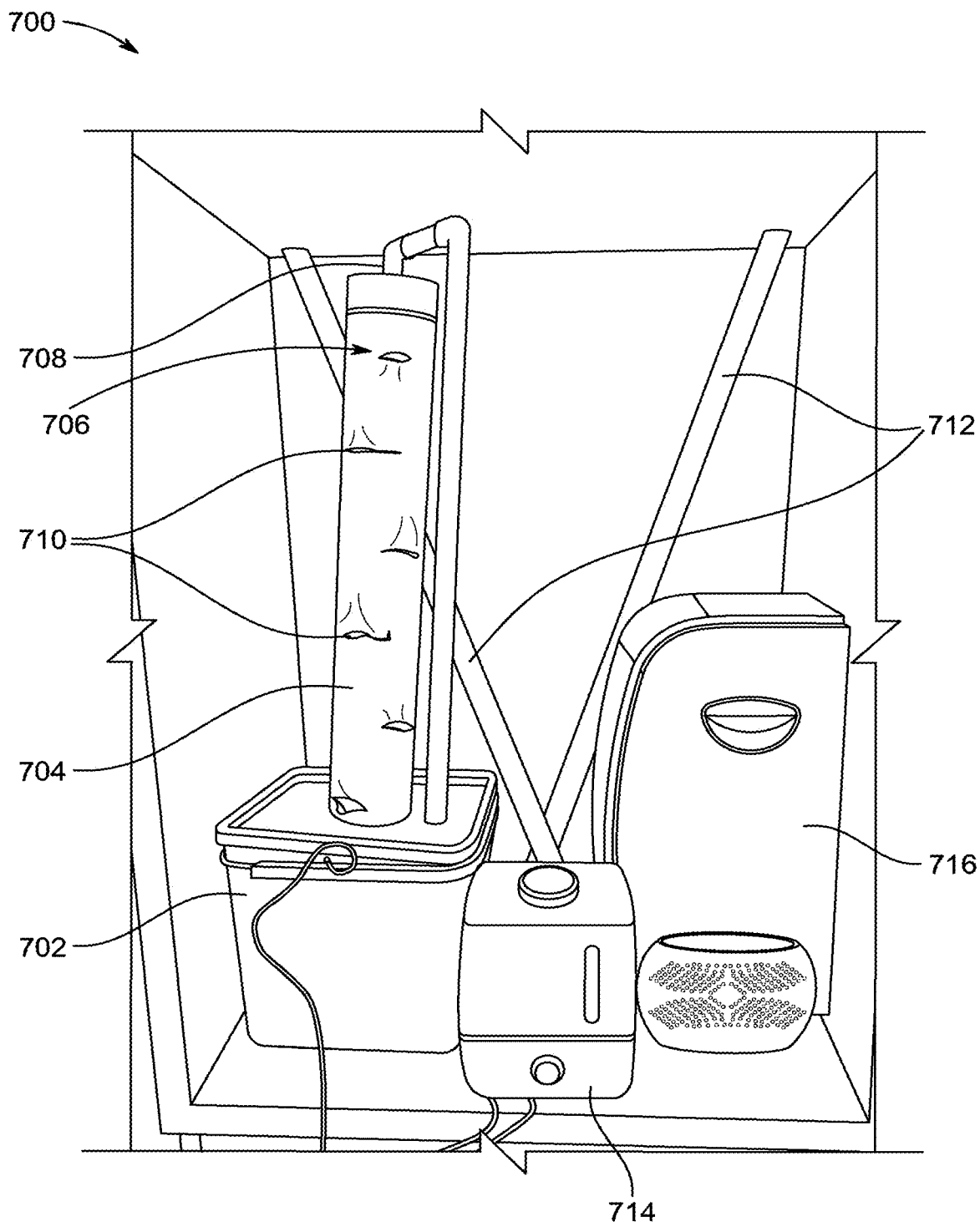
FIG. 7 is a pictorial representation of a prototype of the tower garden, according to certain embodiments.

Referring to FIG. 7, a pictorial representation of a prototype 700 of the tower garden 100 is illustrated, according to an embodiment of the present disclosure. As shown in FIG. 7, the prototype 700 of the tower garden 100 includes a base 702. The base 702 includes an agricultural medium and a pump. The agricultural medium is stored inside the base 702 and is pumped by the pump as required. Further, the prototype 700 of the tower garden 100 includes a vertical column 704 including a plurality of growth module 706. In one embodiment, the plurality of growth modules 706 may be detachably coupled to the vertical column 704. In another embodiment, the plurality of growth modules 706 may be integrally defined in the vertical column 704. Each growth module 706 includes a plastic pocket 710. Furthermore, a perforated hose 708 passes through the center of the vertical column 704 in a vertical direction. The perforated hose 708 irrigates the growth module 706 with the agricultural medium.

The prototype 700 of the tower garden 100 may further include a pair of artificial ultraviolet (UV) lights 712 for photosynthesis of the plants present inside the growth module 706. In one embodiment, the artificial light source for the tower garden 100 may be light emitting diode (LED) lights as LEDs are power efficient and radiate low amount of heat energy. In some embodiments, the pair of artificial UV lights may have a power rating of 10-25 watts, preferably 15-20 watts, preferably about 16 watts (W) and an operating voltage range of 220 to 240 volts (V) or 110-120 volts (e.g. 110 volts). The prototype 700 of the tower garden 100 further includes a humidifier 714. In some embodiments, the humidifier 714 has a power rating of 15-35 watts, preferably 20-30 watts, preferably about 25 W and an operating voltage of 220 to 240 volts (e.g. 240 V) or 110-120 volts (e.g. 110 volts). The humidifier 714 includes a filter which may remove the impurities from the water present in the humidifier 714. The prototype 700 of the tower garden 100 further includes a heating, ventilation, and air-conditioning (HVAC) system 716. The HVAC system 716 is configured to maintain an average humidity of 70-90%, preferably 75-85%, preferably 77-83%, and an average temperature of 18-24° C., preferably 20-22° C., preferably about 21° C., within the prototype 700 of the tower garden 100. The HVAC system 716 may include an evaporative cooler to maintain optimal humidity levels (75%-95%) for the plants 205 in the tower garden 100. In some embodiments, the power rating of the evaporative cooler may be 55-75 W, preferably 60-70 W, preferably about 65 W.

In some embodiments, the tower garden 100 includes the solar panel 201 configured to provide the power for the tower garden 100. Particularly, the tower garden 100 utilizes solar energy to provide supplemental energy to the tower garden 100. The use of solar energy makes the tower garden 100 sustainable and energy efficient. In some embodiments, the tower garden 100 may include a solar photovoltaic system in combination with electricity from the power grid resulting in a hybrid electrical system. The tower garden 100 may include a set of batteries dedicated to store energy generated from the solar photovoltaic system. The batteries may be further utilized to supply the energy required by the tower garden 100. Battery sizing data of an exemplary implementation of the tower garden 100 is shown in Table 1.

TABLE 1

Battery sizing data

| Battery Sizing Data | Solar System | Project load |
|---|---|---|
| Load Power + Future | 55 | 200 |
| Voltage (V) | 24 | 12 |
| Load Current (A) | 2.291666667 | 16.6666667 |
| Backup Time hours (BT) | 120 | 120 |
| Aging Factor (AF) | 1.25 | 1.25 |
| Design Factor (DF) | 1.1 | 1.1 |
| Temperature Compensation factor @ 25 C. | 1.05 | 1.05 |
| Battery Ah @ 120 (A8 = A3 * A4 * A5 * A6 * A7) | 397.03125 | 2887.5 |
| Selected battery Sizing | 405 | 3000 |
| B PV SIZING DATA | | |
| Total Days in a month | 30 | 30 |
| Daily Peak hours in worst month | 5 | 5 |
| Recharge Time | 30 Days | 30 Days |
| Recharge hours = Total days in month * daily peak hours | 150 | 150 |
| Peak PV output as per vendor (A) | 9.1 | 9.1 |
| Daily PV peak output (Ah/Day) | 45.5 | 45.5 |
| Load current (A) | 2.291666667 | 16.6666667 |
| Battery inefficiency factor (BIF) | 1.15 | 1.15 |
| Battery charging current = (Battery Ah * BIF)/Recharge hours (BATTERY AH * BIF)/ RECHARGE HOURS | 3.105 | 23 |
| Daily Load Power (Ah/Day) | 55 | 200 |
| Daily battery charging power = Battery charging current * Daily peak hours | 15.525 | 115 |
| Total daily Power (Ah/Day) = Daily Battery charging Power + Daily Load Power | 70.525 | 315 |
| Adjusted Daily Power (Ah/Day) = Total daily Power * Aging (1.1) * Dust (1.1) + Future (20%) | 99.44025 | 444.15 |
| No. of Parallel Modules | 2.1855 | 9.76153846 |
| Selected No. of Parallel Modules | 3 | 10 |

Figure 8:
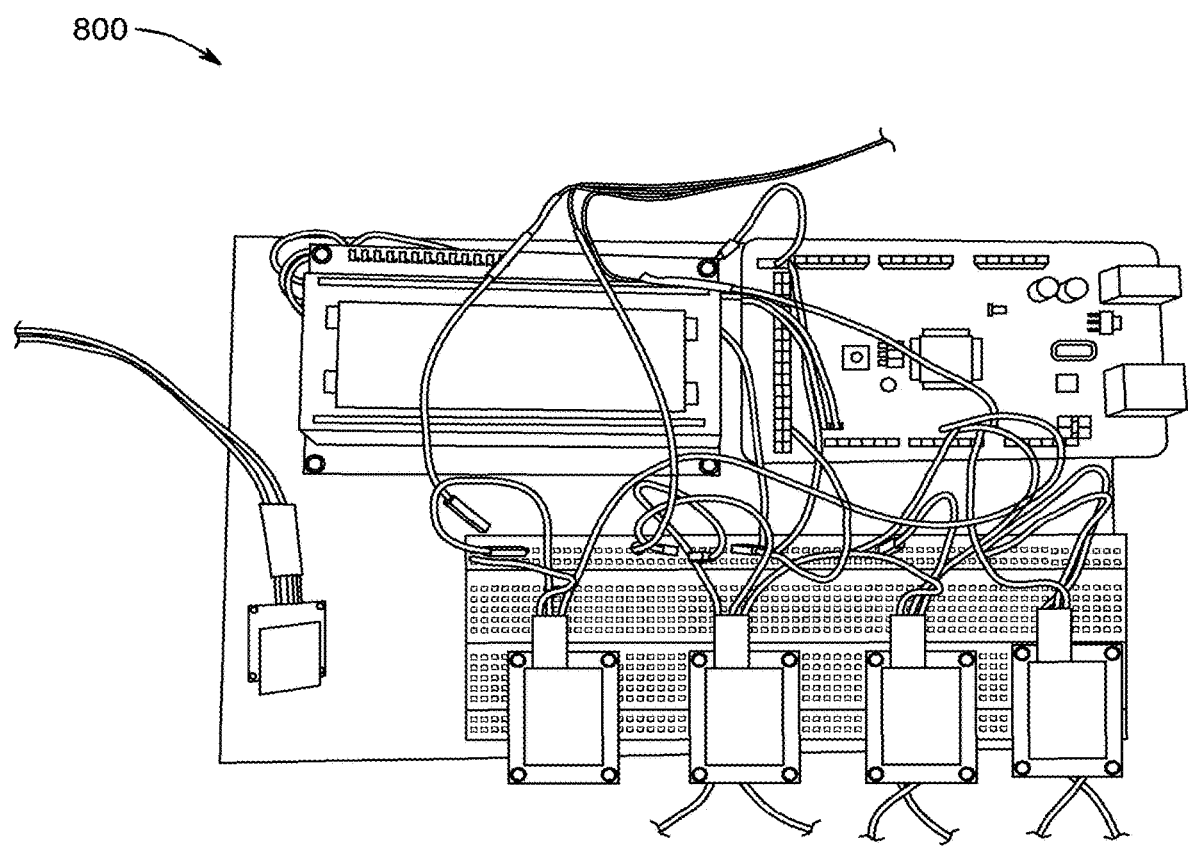
FIG. 8 is a pictorial representation of a control system for the tower garden, according to certain embodiments.

Referring to FIG. 8, a pictorial representation of a control system 800 for the tower garden 100 is illustrated, according to an embodiment of the present disclosure. The control system 800 is designed with four relays to control and power the plurality of components of the prototype 700 of the tower garden 100. Generally, a relay is an electromechanical device used to make or break an electrical connection. Each relay is electrically coupled with a printed circuit board using wires and solders. The printed circuit board has other components like, but are not limited to, resistors, inductors, and capacitors.

The control system 800 may include the controller 216 configured to repeatedly cause the agricultural medium 206 to flow upward via the perforated hose 208 and cascade over the roots of the plants 205 planted in the tower garden 100. The control system 800 has a plurality of input terminals and a plurality of output terminals. At least one input terminal receives electrical energy and disperses it to at least one output terminal which is electrically coupled to the prototype 700 of the tower garden 100. As such, the prototype 700 receives electrical power. The controller 216 of the control system 800 may be in communication with the temperature sensor and the humidity sensor to receive inputs from the temperature and humidity sensors at one of the plurality of input terminals of the control system 800. In one embodiment, the control system 800 may include a screen. In an example, the screen may be an LED display. The display shows the current readings of the temperature and humidity sensors employed in the prototype 700 of the tower garden 100, such that, a user can continuously monitor the environment of the tower garden 100. To achieve optimal harvest from the plants in the tower garden 100, the screen enables factors like, but are not limited to, humidity, temperature, and $CO_2$ concentration, to be continuously monitored.

Numerous modifications and variations of the present disclosure are possible in light of the above teachings. It is therefore to be understood that within the scope of the appended claims, the invention may be practiced otherwise than as specifically described herein.

The invention claimed is:

1. A high density plant growth apparatus comprising:
a vertical column comprising a plurality of growth modules that are stacked over and connected to each other in a vertical direction and configured to grow plants in the vertical direction, wherein the growth modules are disposed on the vertical column as a plurality of rows vertically oriented with a vertical axis of the vertical column;
a base in the form of a rectangular container having four sides and a bottom positioned below the vertical column and configured to receive a reservoir comprising a liquid agricultural medium, wherein a bottom end of the vertical column rests on the bottom of the base; and
a perforated hose extending from the base to the vertical column in the vertical direction and configured as a conduit for the agricultural medium to flow upward and cascade over roots of the plants, wherein the perforated hose is fluidly connected to each growth module of the plurality of growth modules via a respective opening of the perforated hose;
wherein:
each growth module comprises a plastic pocket with a hole,
at least a portion of the plastic pocket comprises a membrane that is permeable to water vapor and impermeable to liquid water,
the membrane consists of an outer layer and an inner layer, wherein the outer layer consists of polytetrafluoroethylene (PTFE) wherein the inner layer consists of collagen or a silica sol gel wherein the outer layer faces away from the vertical column and the inner layer faces towards the vertical column, wherein the inner layer is adjacent the outer layer and, the inner layer being a continuous layer having a thickness of 50-250 µm, and
wherein the outer layer and the inner layer are configured for a plant root to grow through the inner layer and pores of the outer layer and extend outside the membrane for air exposure.

2. The high density plant growth apparatus of claim 1, wherein the outer layer is stretched or expanded PTFE, wherein the plastic pocket has an opening at a top of the plastic pocket, and wherein the hole faces forward away from the vertical column and downward towards the base and is covered with the membrane.

3. The high density plant growth apparatus of claim 1, wherein the membrane is configured to allow water vapor to exit to prevent overheating inside the plastic pocket.

4. The high density plant growth apparatus of claim 1, wherein the hole is covered by the membrane that is configured to physically support a plant.

5. The high density plant growth apparatus of claim 1, wherein at least one portion of the plastic pocket is heat-insulating and impermeable to liquid water and water vapor.

6. The high density plant growth apparatus of claim 5, wherein the at least one portion of the plastic pocket comprises polystyrene.

7. The high density plant growth apparatus of claim 1, wherein the perforated hose comprises:
   a first inlet configured to receive the agricultural medium; and
   a second inlet configured to receive artificial light for the perforated hose to function as a perforated light guide pipe.

8. The high density plant growth apparatus of claim 7, wherein the perforated hose is transparent.

9. The high density plant growth apparatus of claim 8, wherein the perforated hose includes at least one material selected from the group consisting of an acrylic polymer, a cyclic olefin polymer, a polycarbonate, a polymethacrylmethylimide, a silicone resin and glass.

10. The high density plant growth apparatus of claim 7, wherein the perforated hose further comprises a third inlet configured to receive a gas to control at least one of humidity or temperature.

11. The high density plant growth apparatus of claim 10, wherein the perforated hose is heat resistant to at least 50° C.

12. The high density plant growth apparatus of claim 1, further comprising a pump configured to cause the agricultural medium to flow from the reservoir via the perforated hose to a top area of the vertical column.

13. The high density plant growth apparatus of claim 1, further comprising a controller configured to repeatedly cause the agricultural medium to flow upward via the perforated hose and cascade over the roots of the plants.

14. The high density plant growth apparatus of claim 1, further comprising a solar panel configured to provide power for the high density plant growth apparatus.

* * * * *